United States Patent
Devale et al.

(10) Patent No.: US 7,171,545 B2
(45) Date of Patent: Jan. 30, 2007

(54) PREDICTIVE FILTERING OF REGISTER CACHE ENTRY

(75) Inventors: John P. Devale, Austin, TX (US); Bryan P. Black, Austin, TX (US); Edward A. Brekelbaum, Pflugerville, TX (US); Jeffrey P. Rupley, II, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 10/747,625

(22) Filed: Dec. 30, 2003

(65) Prior Publication Data

US 2005/0149681 A1 Jul. 7, 2005

(51) Int. Cl.
*G06F 9/30* (2006.01)

(52) U.S. Cl. ................... 712/217; 712/218

(58) Field of Classification Search ............ None
See application file for complete search history.

(56) References Cited

U.S. PATENT DOCUMENTS

| | | | | |
|---|---|---|---|---|
| 6,088,784 | A * | 7/2000 | Choquette ............... | 712/32 |
| 6,105,103 | A * | 8/2000 | Courtright et al. .......... | 711/1 |
| 6,263,416 | B1 * | 7/2001 | Cherabuddi .............. | 712/23 |
| 6,272,598 | B1 * | 8/2001 | Arlitt et al. ............. | 711/133 |
| 6,823,428 | B2 * | 11/2004 | Rodriguez et al. ......... | 711/136 |
| 6,934,797 | B2 * | 8/2005 | Regev et al. ............ | 711/108 |
| 6,934,830 | B2 * | 8/2005 | Kadambi et al. .......... | 712/214 |
| 6,986,024 | B2 * | 1/2006 | Nguyen et al. ........... | 712/207 |
| 6,996,676 | B2 * | 2/2006 | Megiddo et al. .......... | 711/129 |

OTHER PUBLICATIONS

Balasubramonian, R., et al. "Reducing the Complexity of the Register File in Dynamic Superscalar Processors." *Proc. of the 34th Int. Symposium on Microarchitecture (MICRO34)*, Dec. 2001.
Brekelbaum, N., et al., "Hierarchical Scheduling Windows." *Proc. of the 35th Int. Symposium on Microarchitecture (MICRO35)*, Nov. 2002.
Cruz, K. et al., "Multiple-banked Register File Architectures." *Proc. Of the Int. Symposium on Computer Architecture*, Jun. 2000.
Gonzalez, A., et al., "Virtual-physical registers." *Proc. of the 4th Int. Symposium on High Performance Computer Architecture*, Feb. 1998.
Hinton, G., et al., "The Microarchitecture of the Pentium 4® Processor." *Intel Technical Journal*, Q1 2001, pp. 1-13.
"Intel® Itanium® Architecture Software Developer's Manual." Intel Corporation 2002.
Jiménez, D. and C. Lin, "Dynamic Branch Prediction with Perceptrons," *Proc. of the 7th Int. Symposium on High Performance Computer Architecture (HPCA)*, 2001.
Kim, I. and Lipasti, M., "Half-Price Architecture." *Proc. of the Intl. Symposium on Computer Architecture*, 2003.

(Continued)

*Primary Examiner*—Eddie Chan
*Assistant Examiner*—Jacob Petranek
(74) *Attorney, Agent, or Firm*—Shireen I. Bacon

(57) ABSTRACT

A mechanism, which supports predictive register cache allocation and entry, uses a counter look-up table to determine the potential significances of physical register references.

24 Claims, 7 Drawing Sheets

OTHER PUBLICATIONS

Kim, N., and Mudge, T., "Reducing Register Ports Using Delayed Write-Back Queues and Operand Pre-Fetch." *International Conference on Supercomputing*, 2003.

Kumar, R., "Scalable register file organization for a multiple issue microprocessor." *I.E.E. Electronics Letters*, vol. 32, No. 7, Mar. 28, 1996, pp. 634-636.

Park, I., et al. "Reducing Register Ports for Higher Speed and Lower Energy," *Proc. of the 35th int. Symposium on Microarchitecture (MICRO35)*, Nov. 2002.

Postiff, M., et al., "Integrating Superscalar Processor Components to Implement Register Caching" *International Conference on Supercomputing*, 2001.

Seznec. A., et al., "Register Write Specialization Register Read Specialization: A Path to Complexity-Effective Wise-Issue Superscalar Processors." *Proceedings of the 35th annual ACM/IEEE international symposium on Microarchitecture*, 2002, pp. 1-12.

Shivakumar, P., et al., "An Integrated Cache Timing, Power, and Area Model," *WRL Research Report*, Feb. 2002.

Tseng, J. and K. Asanovic, "Banked Multiported Register Files for High-Frequency Superscalar Microprocessors." *Proc. Of the Intl. Symposium on Computer Architecture*, 2003.

Yung, R. Wilhelm, N., "Caching Processor General Registers." In *Proceedings of the International Conference on Circuits Design*, 1995, pp. 307-312.

Borch, E., Manne, S., Emer, J., Tune, E., "Loose Loops Sink Chips." *The Proceedings of the 8th Int. Symp. on High Performance Computer Architecture*, 2002, pp. 1-12.

* cited by examiner

PREDICTIVE FILTERING OF REGISTER CACHE ENTRY

BACKGROUND OF THE INVENTION

Some embodiments of the present invention are generally related to microprocessors, and more particularly, to register files.

A register system is a key component of a microprocessor. The register system should be responsible and able to deliver data quickly, yet be large enough to support a high level of instruction level parallelism (ILP).

Microprocessors increasingly require fast register files to reduce cycles spent in register read. Each additional cycle spent in register read increases branch misprediction latency. Furthermore, speculative schedulers need a fast register file to reduce the time from scheduling to execution.

A register file's size determines, in a large part, the effective limits of the number of in-flight instructions, and the amount of extractable ILP. Increases in register file size, however, result in a slower structure that requires more power and microprocessor complexity, to operate. Increased complexity may include, for example, inceased number of ports.

BRIEF DESCRIPTION OF THE DRAWINGS

The invention shall be described with reference to the accompanying figures, wherein.

Figure 1:
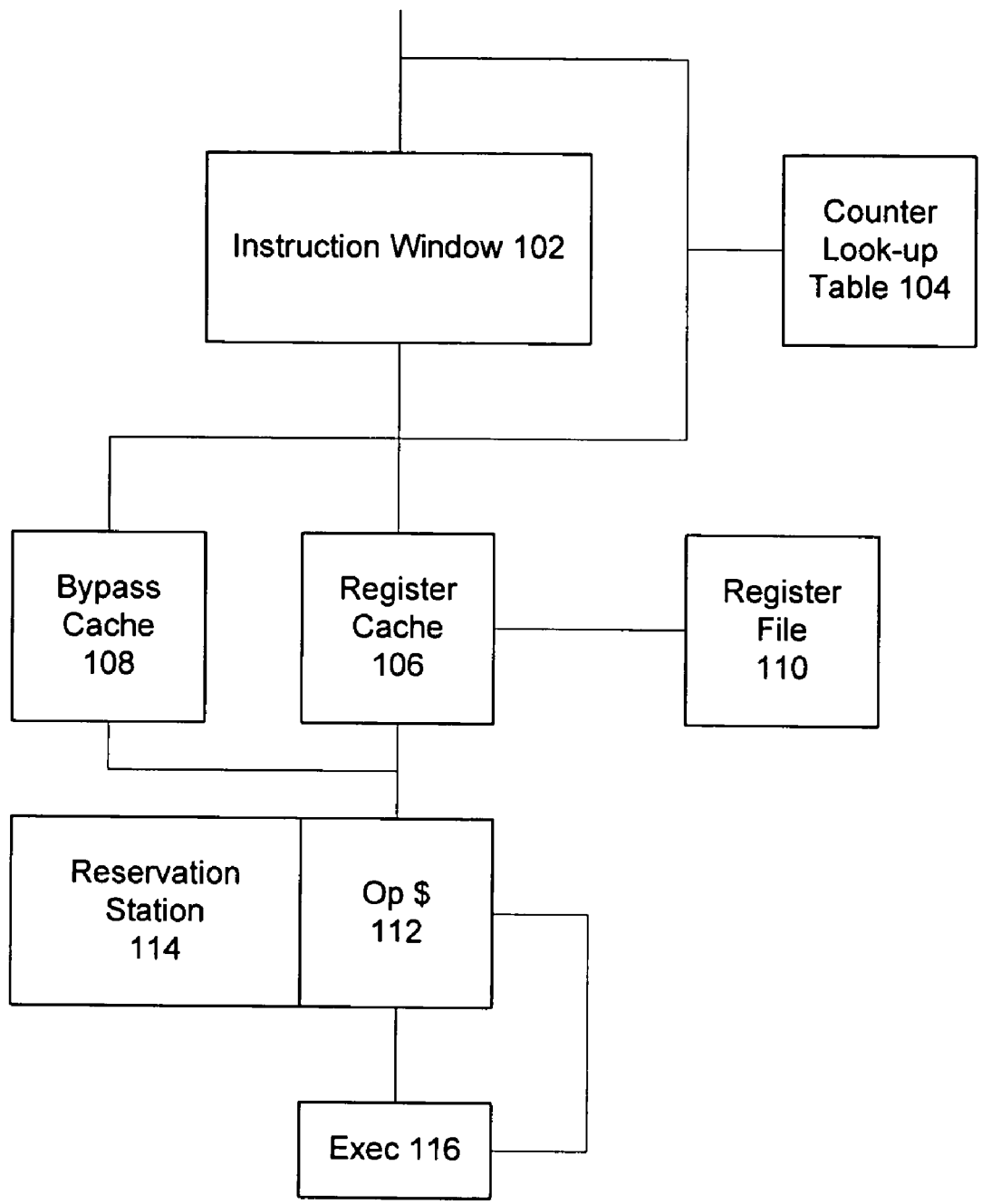
FIG. 1 illustrates a diagram of a register system, according to an embodiment of the present invention.

The invention is now described with reference to the accompanying drawings. In the drawings, like reference numbers generally indicate identical, functionally similar, and/or structurally similar elements. The drawing in which an element first appears is generally indicated by the leftmost digit(s) in the corresponding reference number.

DETAILED DESCRIPTION OF PREFERRED EMBODIMENTS

While the present invention is described in terms of the examples below, this is for convenience only and is not intended to limit its application. In fact, after reading the following description, it will be apparent to one of ordinary skill in the art how to implement the following invention in alternative embodiments (e.g., in systems employing in-order processing, out-of-order processing, etc.).

Furthermore, while the following description focuses on the recovery of instructions in a microprocessor using a form of an Itanium® Processor Family (IPF) compatible processor or in a Pentium® compatible processor family (both manufactured by Intel® Corporation, Santa Clara, Calif.), it is not intended to limit the application of the present invention. It will be apparent to one skilled in the relevant art how to implement the following invention, where appropriate, in alternative embodiments. For example, the present invention may be applied, alone or in combination, with various microprocessor architectures and their inherent features, such as, but not limited to, complex instruction set (CISC), reduced instruction set (RISC), very long instruction word (VLIW), and explicitly parallel instruction computing (EPIC).

In this detailed description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, such as, "connected" and "electrically connected", may be used. It should be understood that "coupled" may mean that two or more elements are in direct physical or electrical contact with each other or that the two or more elements are not in direct contact but still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The present invention may provide efficient and predictive register cache entry allocation and fill. The register cache of the present invention, according to the embodiments discussed herein, filters read activity from the register file. The filtering may enable register files with fewer ports, and lesser activity factors, resulting in reduced power consumption and area, as well as improved average read latency. This filtering, and the reduction of register file cost, may be important to architectures that have either a large number of architected registers, such as in Intel Architecture-64 bit (IA-64), an instruction set architecture (ISA), or in large instruction windows for extracting ILP in an out-of-order execution core, in other ISAs, such as but not limited to IA-32, POWER PC®, and AMD 64®. POWER PC® is a registered trademark of International Business Machines Corp. or Armonk, N.Y. AMD 64® is a registered trademark of Advanced Micro Devices, Inc. of Sunnyvale, Calif. Additional trademark rights may apply. The present invention is not limited to these architectures, as one of ordinary skill in the art(s) would recognize, based at least on the teachings provided herein.

With respect to FIG. 1, a diagram of a register system, according to an embodiment of the present invention, is shown. The register system may include additional components than are shown in FIG. 1. The register system is not limited to the components described herein, and one of ordinary skill in the art would recognize that additional or alternative components may be required based upon at least the design of the microprocessor. As such, the register system may begin with an instruction window 102. The instruction window 102 may contain one or more instructions. The instruction window 102 may be coupled to a counter look-up table (CLT) 104. The CLT 104 may track physical register references that are currently active in the instruction window 102. In embodiments of the present invention, the CLT 104 may be accessed to determine a potential significance when an opportunity to cache occurs. The instruction window 102 may be connected to register cache 106 and bypass cache 108. The register cache 106 may be connected to register file 110. The bypass cache 108 may provide a path for instructions that is not connected to the register file 110. Both caches 106 and 108 may be connected to a reservation station 114. The reservation station 114 may buffer operands of instructions waiting to be scheduled for execution or issue. It may eliminate the need to get the operands from registers and may be similar to forwarding operations. As illustrated, the reservation station 114 may include an operand cache (Op $) 112 to perform this function. In some embodiments of the present invention, the reservation station 114 may hold 1) instructions that have been issued and are awaiting execution at a functional unit, e.g. execution unit 116, 2) the operands for that instruction if they have already been computed (or the source of the operands otherwise), and 3) the information needed to control the instruction once it has begun execution or other operations exemplified by exec 116.

Figure 2:
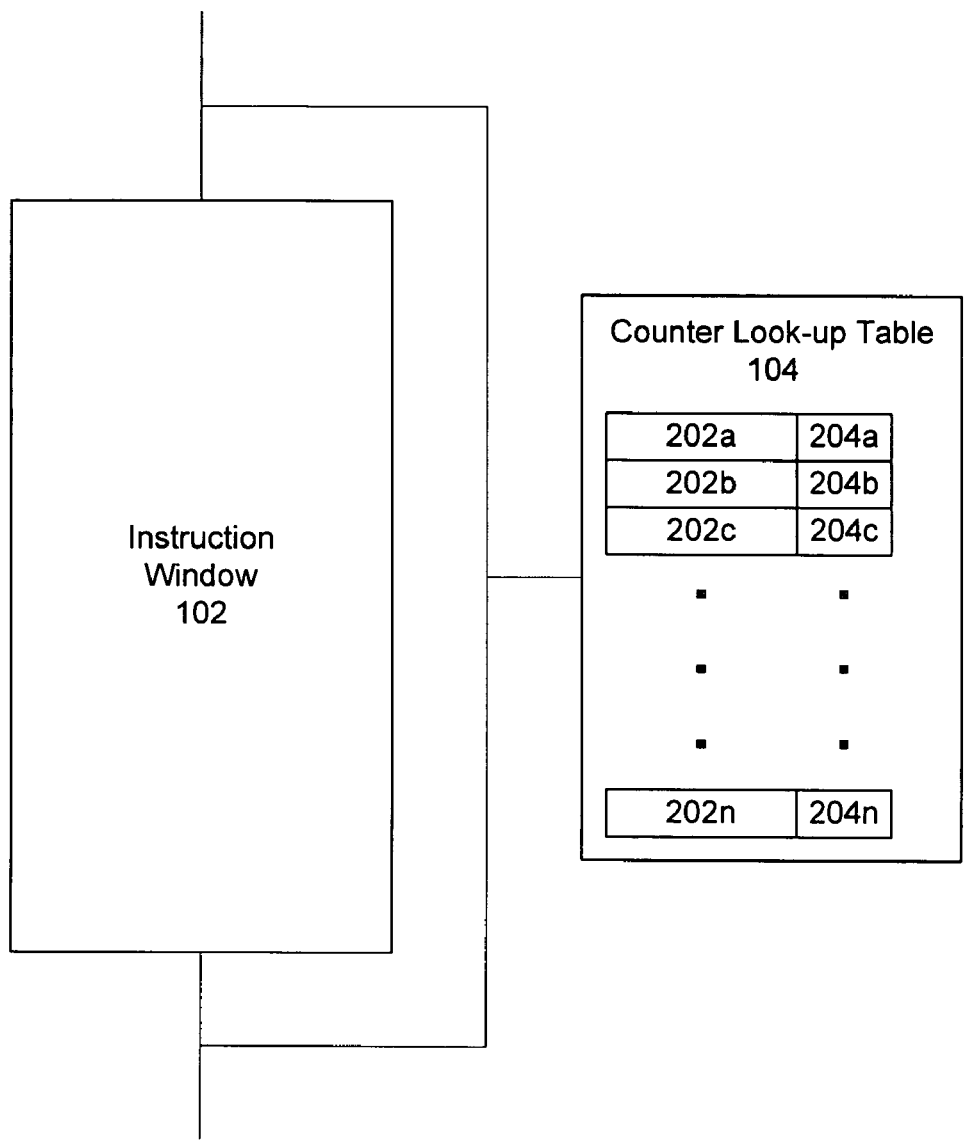
FIG. 2 illustrates a diagram of a counter look-up table, according to an embodiment of the present invention.

Referring now to FIG. 2, a diagram of the CLT 104 is shown, according to an embodiment of the present invention. The CLT 104 includes at least one pairing of a physical register identifier 202 and a counter 204. The physical register identifier 202 may index reference counts of physical register accesses in the instruction window 102. In one embodiment, the physical register identifiers 202a–n may contain information indicating one or more particular registers. In a further embodiment, the counters 204a–n may contain reference count information related to the one or more registers indicated by the identifiers 202a–n. The counter 204 may be indicative of the potential significance of placing the data into the register cache.

According to embodiments of the present invention, the CLT 104 size may be dependent on the size of the of the instruction window 104. In one embodiment, the CLT 104 may be a saturating counter that is reset upon register reuse to conserve counter size.

The above-described embodiments, described with regard to FIGS. 1–2, are now further described with respect to the opportunities for a physical register data to be written into a register cache. In one embodiment, a demand miss may occur, where physical register data is required, but is not contained by the register cache. In another embodiment, data may be produced by an execution unit, such as exec 116. In yet another embodiment, a prefetch mechanism may be employed to provide data that may be required prior any miss penalty.

While three such opportunities are described above, the present invention is not limited to these opportunities. One of ordinary skill in the art would recognize, based at least upon the teachings provided herein, that other opportunities may occur based on the architecture and/or operation of the register system to which the present invention is applied.

Figure 3:
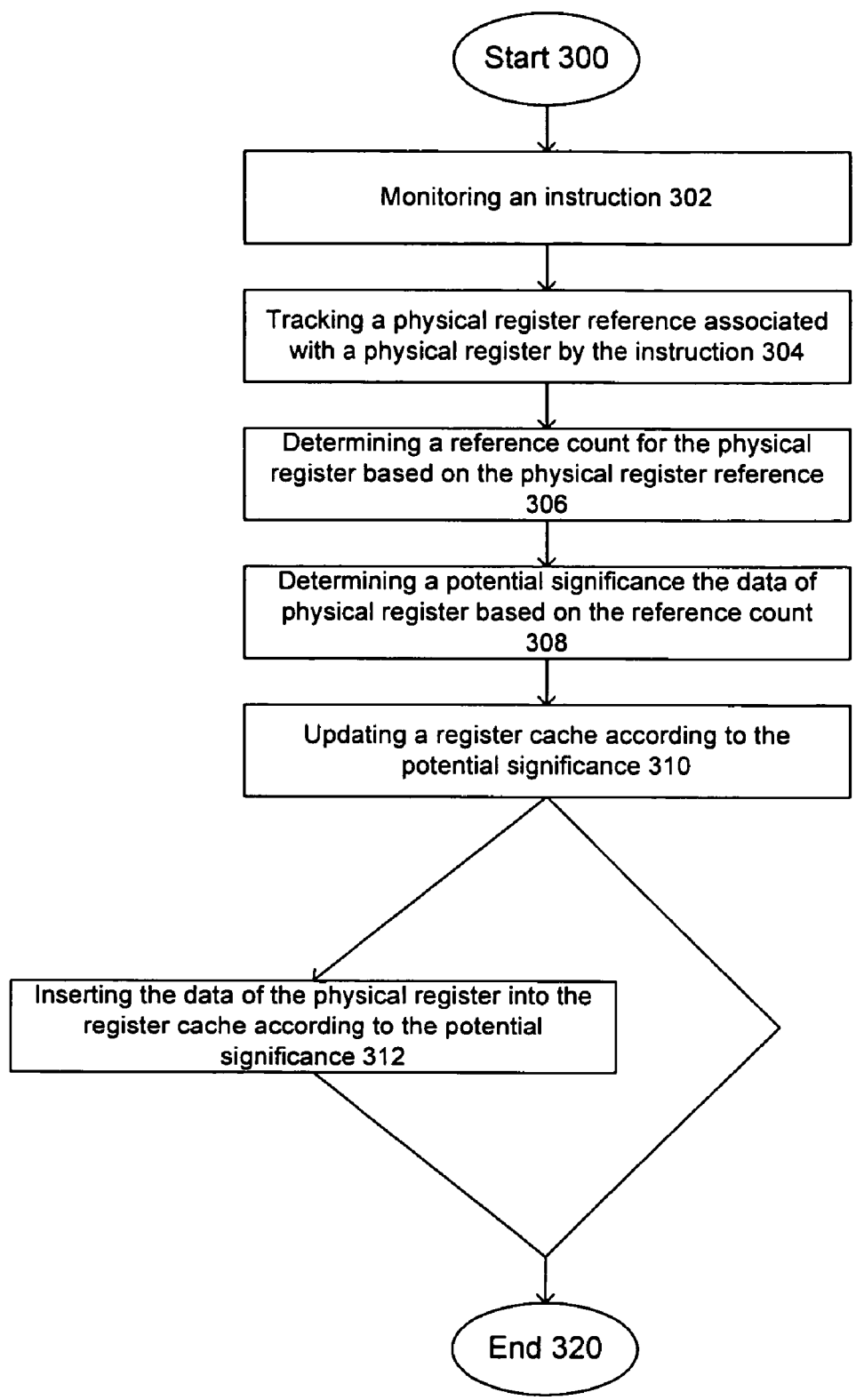
FIGS. 3–4 illustrate flow diagrams of predictive filtering of register cache entries, according to embodiments of the present invention.
Figure 4:
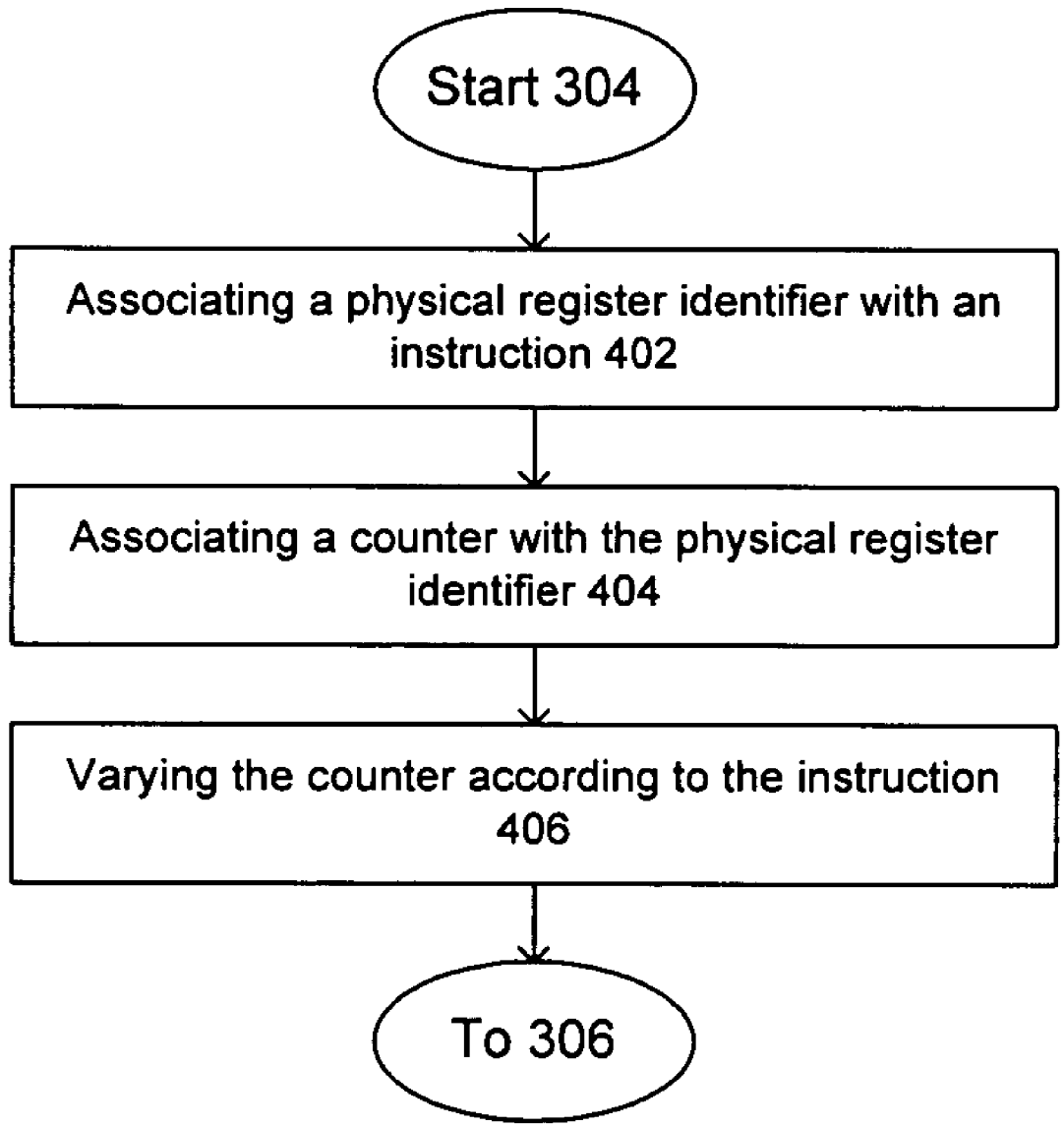

Flow diagrams of predictive filtering of register cache entries, according to embodiments of the present invention, are shown in FIGS. 3–4.

The present invention, implemented by the components and their equivalents described above may perform the following activities during operation. The process begins at block 300 and may proceed to block 302 where the process may monitor at least one instruction in an instruction window, such as instruction window 102. The process may then proceed to block 304, where it may track one or more physical register references associated with one or more physical registers called on by the at least one instruction. The process may proceed to block 306, where it may determine a reference count for the one or more physical registers based on the one or more physical register references. From this reference count, the process may then proceed in block 308 to determine a potential significance for data of the one or more physical registers. The process may then proceed to block 310 where it may update at least one register cache according to the potential significance.

According to embodiments of the present invention, the process may proceed to optional block 312, where it may insert the data of the one or more physical registers into the at least one register cache according to the potential significance previously determined. The process may then proceed to block 320 where it may terminate. The process may be repeated any number of times, and may operate in multiple instances on various registers in parallel. In alternative embodiments, the insertion of the data may be conditional on the potential significance being high or low.

In some embodiments of the present invention, the data may be inserted into an empty slot in the at least one register cache. In alternative embodiments of the present invention, the process may select previous data from a slot in the at least one register cache according to the potential significance of the previous data. Based on a comparison of the potential significances between the previous data and the data to be inserted, the process may evict the previous data from the slot in the at least one register cache prior to inserting the data.

The flow diagram of FIG. 4 illustrates one embodiment of the tracking block 304 described above. Alternative embodiments may be apparent to one of ordinary skill in the arts based at least upon the teachings provided herein. The process may reach block 304 and may track one or more physical register references by associating at least one physical register identifier with the at least one instruction (block 402). The process may then proceed to block 404 and may associate at least one counter with the physical register identifier. The process may proceed to block 406, where it may vary the at least one counter for each of the physical register references according to the at least one instruction. In one embodiment, the counter may be incremented for each of the at least one physical register references.

According to the operating environments discussed below, the process of the present invention, according to the embodiments described above, may be implemented in an apparatus designed to perform these operations. Such an apparatus may include an instruction window of at least one instruction, one or more physical registers to store data associated with the at least one instruction, a counter look-up table to track one or more physical register references associated with the one or more physical registers, a circuit to determine a reference count for the one or more physical registers and a potential significance for data of the one or more physical registers based on the reference count, and at least one register cache, wherein the circuit updates the at least one register cache according to the potential significance.

Figure 5:
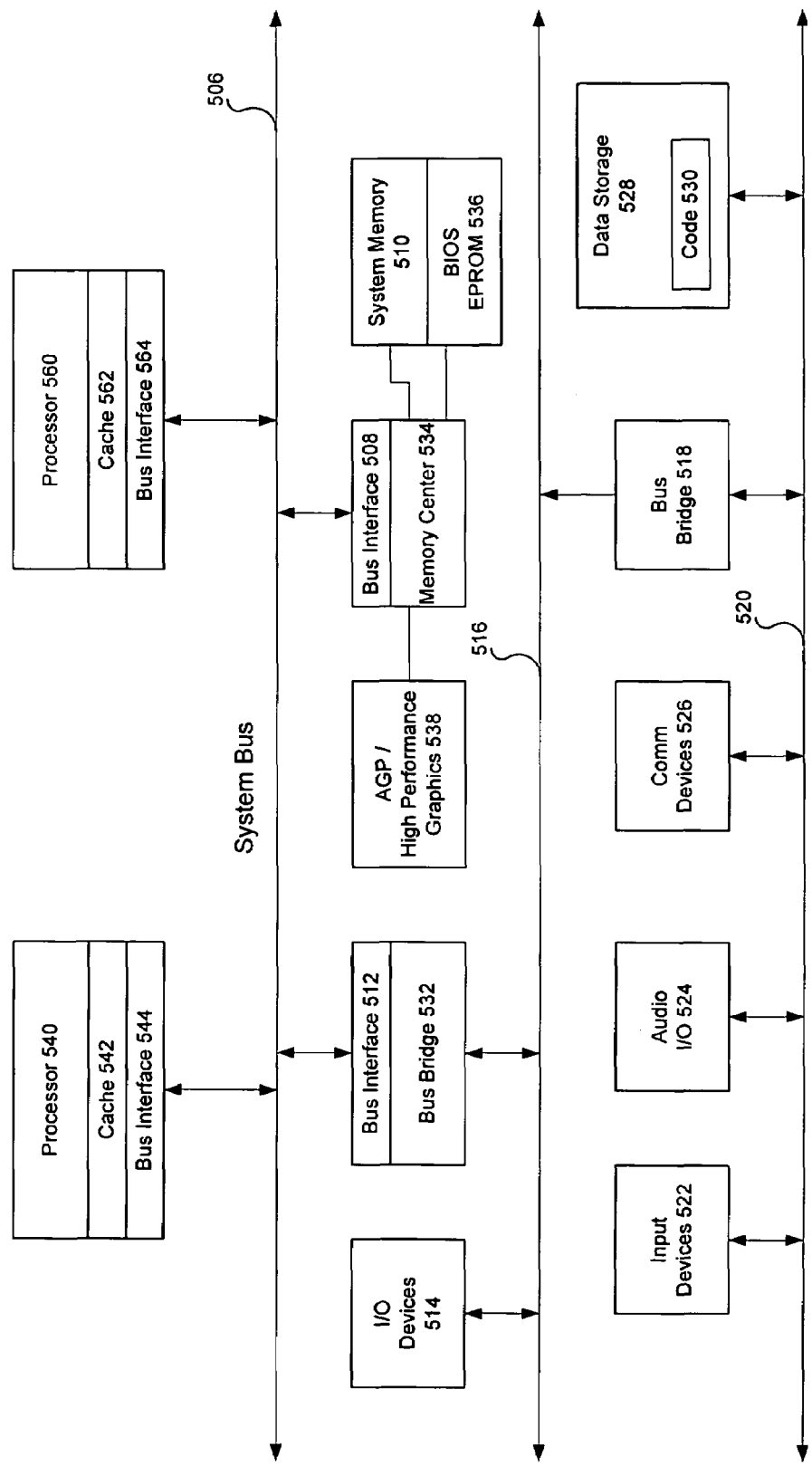
FIGS. 5–6 illustrates diagrams of system environments capable of being adapted to perform the operations of register caching, according to embodiments of the present invention.
Figure 6:
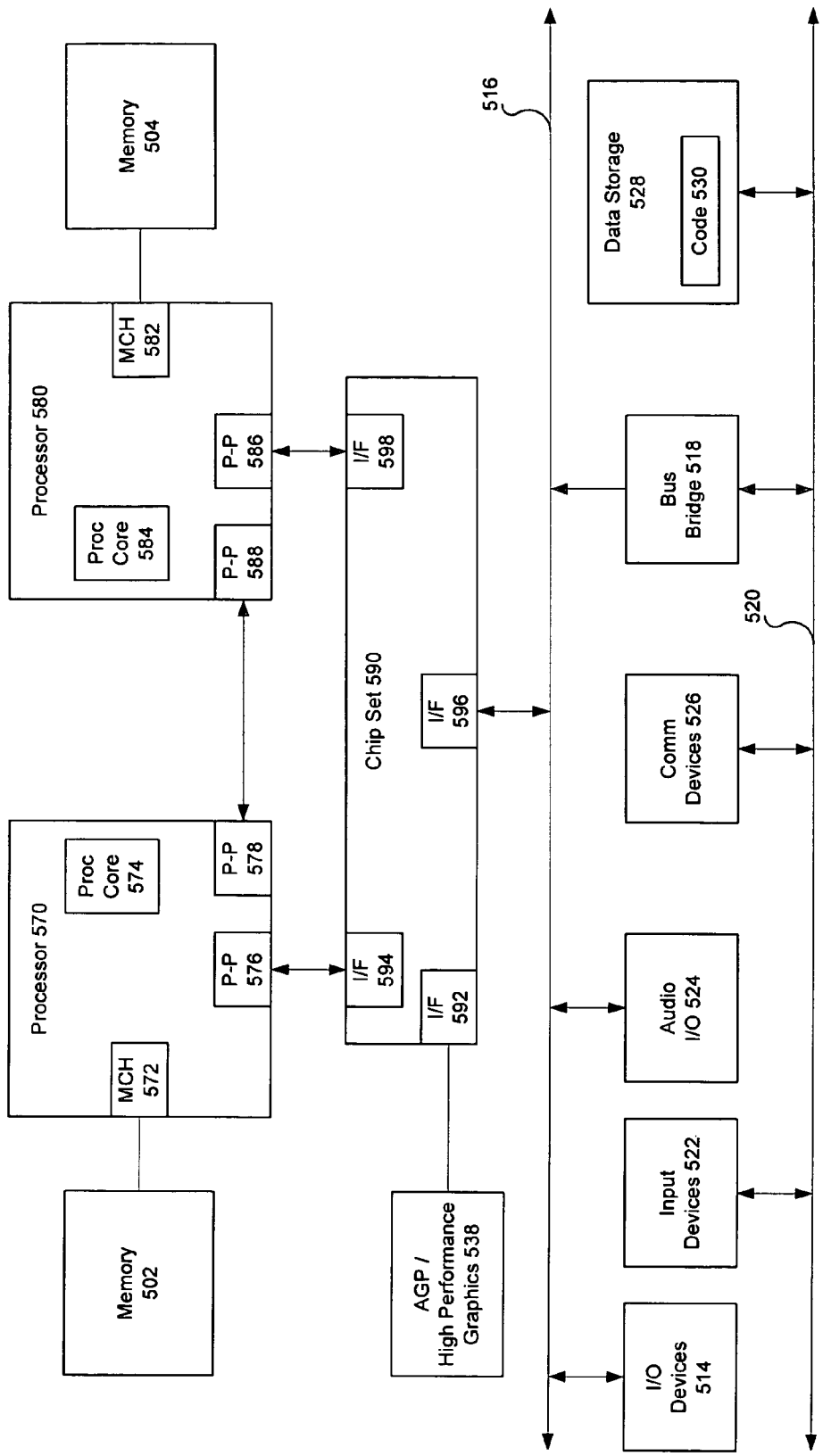

Specifically, and only by way of example, the present invention (i.e., the processes of FIGS. 3–4 and the components of FIGS. 1–2 or any part thereof) may be implemented using one or more microprocessor architectures or a combination thereof and may be implemented with one or more memory hierarchies. In fact, in one embodiment, the invention may be directed toward one or more processor environments capable of carrying out the functionality described herein. Examples of system environments 500 and 600 are shown in FIGS. 5 and 6 and may include one or more central processing units, memory units, and buses. The system environments 500 and 600 may include a core logic system chip set that connects a microprocessor to a computing system. Various microprocessor architecture embodiments are may be described in terms of these exemplary microprocessing and system environments. After reading this description, it will become apparent to a person of ordinary skill in the art how to implement the invention using other micro-processing and/or system environments, based at least on the teachings provided herein.

Referring now to FIGS. 5 and 6, schematic diagrams of systems including a processor supporting execution of speculative threads are shown, according to two embodiments of the present invention. The system environment 500 generally shows a system where processors, memory, and input/output devices may be interconnected by a system bus, whereas the system environment 600 generally shows a system where processors, memory, and input/output devices may be interconnected by a number of point-to-point interfaces.

The system environment 500 may include several processors, of which only two, processors 540, 560 are shown for clarity. Processors 540, 560 may include level one (L1) caches 542, 562. The system environment 500 may have several functions connected via bus interfaces 544, 564, 512, 508 with a system bus 506. In one embodiment, system bus 506 may be the front side bus (FSB) utilized with Pentium® class microprocessors. In other embodiments, other busses may be used. In some embodiments memory controller 534 and bus bridge 532 may collectively be referred to as a chip set. In some embodiments, functions of a chipset may be divided among physical chips differently from the manner shown in the system environment 500.

Memory controller 534 may permit processors 540, 560 to read and write from system memory 510 and/or from a basic input/output system (BIOS) erasable programmable read-only memory (EPROM) 536. In some embodiments BIOS EPROM 536 may utilize flash memory. Memory controller 534 may include a bus interface 508 to permit memory read and write data to be carried to and from bus agents on system bus 506. Memory controller 534 may also connect with a high-performance graphics circuit 538 across a high-performance graphics interface 539. In certain embodiments the high-performance graphics interface 539 may be an advanced graphics port (AGP) interface. Memory controller 534 may direct read data from system memory 510 to the high-performance graphics circuit 538 across high-performance graphics interface 539.

The system environment 600 may also include several processors, of which only two, processors 570, 580 are shown for clarity. Processors 570, 580 may each include a local memory channel hub (MCH) 572, 582 to connect with memory 502, 504. Processors 570, 580 may exchange data via a point-to-point interface 550 using point-to-point interface circuits 578, 588. Processors 570, 580 may each exchange data with a chipset 590 via individual point-to-point interfaces 552, 554 using point to point interface circuits 576, 594, 586, 598. Chipset 590 may also exchange data with a high-performance graphics circuit 538 via a high-performance graphics interface 592.

In the system environment 500, bus bridge 532 may permit data exchanges between system bus 506 and bus 516, which may in some embodiments be a industry standard architecture (ISA) bus or a peripheral component interconnect (PCI) bus. In the system environment 600, chipset 590 may exchange data with a bus 516 via a bus interface 596. In either system, there may be various input/output I/O devices 514 on the bus 516, including in some embodiments low performance graphics controllers, video controllers, and networking controllers. Another bus bridge 518 may in some embodiments be used to permit data exchanges between bus 516 and bus 520. Bus 520 may in some embodiments be a small computer system interface (SCSI) bus, integrated drive electronics (IDE) bus, or universal serial bus (USB) bus. Additional I/O devices may be connected with bus 520. These may include input devices 522, which may include, but are not limited to, keyboards, pointing devices, and mice, audio I/O 524, communications devices 526, including modems and network interfaces, and data storage devices 528. Software code 530 may be stored on data storage device 528. In some embodiments, data storage device 528 may be, for example, but is not limited to, a fixed magnetic disk, a floppy disk drive, an optical disk drive, a magneto-optical disk drive, a magnetic tape, or non-volatile memory including flash memory.

Figure 7:
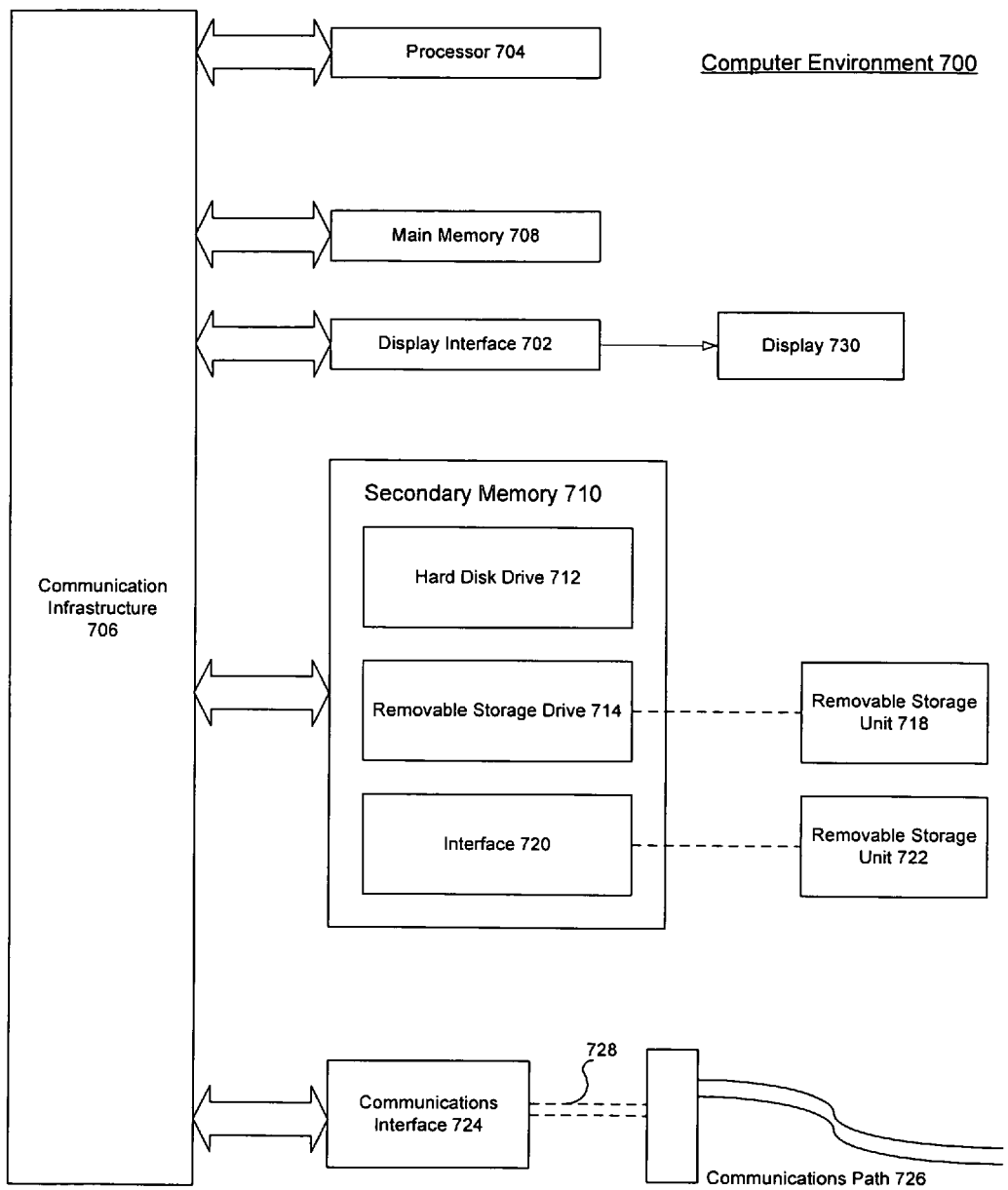
FIG. 7 illustrates a diagram of a computing environment capable of being adapted to perform the operations of register caching, according to an embodiment of the present invention.

Embodiments of the present invention (e.g., predictive filtering of register cache entries, the register system or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 700 is shown in FIG. 7. The computer system 700 may include one or more processors, such as processor 704. The processor 704 may be connected to a communication infrastructure 706 (e.g., a communications bus, cross over bar, or network). Various software embodiments may be described in terms of this exemplary computer system. After reading this description, it will become apparent to a person skilled in the relevant art(s) how to implement the invention using other computer systems and/or computer architectures.

Computer system 700 may include a display interface 702 that may forward graphics, text, and other data from the communication infrastructure 706 (or from a frame buffer not shown) for display on the display unit 730.

Computer system 700 may also include a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc, but which is not limited thereto. The removable storage drive 714 may read from and/or write to a removable storage unit 718 in a well known manner. Removable storage unit 718, may represent a floppy disk, magnetic tape, optical disk, etc. which may be read by and written to by removable storage drive 714. As will be appreciated, the removable storage unit 718 may include a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include, but are not limited to, a program cartridge and cartridge interface (such as that found in video game devices), a removable memory chip (such as an EPROM, or PROM) and associated socket, and/or other removable storage units 722 and interfaces 720 that may allow software and data to be transferred from the removable storage unit 722 to computer system 700.

Computer system 700 may also include a communications interface 724. Communications interface 724 may allow software and data to be transferred between computer system 700 and external devices. Examples of communications interface 724 may include, but are not limited to, a modem, a network interface (such as an Ethernet card), a communications port, a PCMCIA slot and card, etc. Software and data transferred via communications interface 724 are in the form of signals 728 which may be, for example, electronic, electromagnetic, optical or other signals capable of being received by communications interface 724. These signals 728 may be provided to communications interface 724 via a communications path (i.e., channel) 726. This channel 726 may carry signals 728 and may be implemented using wire or cable, fiber optics, a phone line, a cellular phone link, an RF link and/or other communications channels.

In this document, the terms "computer program medium" and "computer usable medium" are used to generally refer to media such as, but not limited to, removable storage drive 714, a hard disk installed in hard disk drive 712, and signals 728. These computer program media are means for providing software to computer system 700.

Computer programs (also called computer control logic) may be stored in main memory 708 and/or secondary memory 710. Computer programs may also be received via communications interface 724. Such computer programs, when executed, enable the computer system 700 to perform the features of the present invention as discussed herein. In particular, the computer programs, when executed, may enable the processor 704 to perform the present invention in accordance with the above-described embodiments. Accordingly, such computer programs represent controllers of the computer system 700.

In an embodiment where the invention is implemented using software, the software may be stored in a computer program product and loaded into computer system 700 using, for example, removable storage drive 714, hard drive 712 or communications interface 724. The control logic (software), when executed by the processor 704, may cause the processor 704 to perform the functions of the invention as described herein.

In another embodiment, the invention may be implemented primarily in hardware using, for example, hardware components such as application specific integrated circuits (ASICs). Implementation of a hardware state machine so as to perform the functions described herein will be apparent to persons skilled in the relevant art(s). As discussed above, the invention may be implemented using any combination of hardware, firmware and software.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. A method, comprising:
   monitoring at least one waiting instruction in an instruction window, wherein the waiting instruction includes a reference to a physical register;
   incrementing a reference count for said physical register based on said reference;
   utilizing said reference count to determine the potential significance of data in said physical register to future instructions; and
   entering said data into at least one register cache according to said potential significance.

2. The method of claim 1, further comprising:
   incrementing said reference count once for each additional reference to said physical register in the instruction window.

3. The method of claim 1, wherein said entering said data is conditional on said potential significance being high.

4. The method of claim 1, wherein said entering said data is conditional on said potential significance being low.

5. The method of claim 1, wherein said entering further comprises inserting data into an empty slot in said at least one register cache.

6. The method of claim 1, further comprising:
selecting previous data from a slot in said at least one register cache according to the potential significance of said previous data; and
evicting said previous data from said slot in said at least one register cache prior to said inserting said data.

7. The method of claim 1, wherein:
said waiting instruction includes a reference to a second physical register; and
said incrementing further comprises incrementing a second reference count for said second physical register based on said reference to the second physical register.

8. The method of claim 1, wherein:
said utilizing is performed responsive to a demand miss.

9. An apparatus, comprising:
one or more physical registers to store data associated with a plurality of instructions;
an instruction window to hold the plurality of instructions, the plurality of instructions including at least one waiting instruction whose data is not yet available in the physical registers;
a counter look-up table to track the number of references to each of said one or more physical registers in the instruction window;
a reference count circuit to determine a potential significance for data of said one or more physical registers based on said number of references; and
at least one register cache, wherein said reference count circuit is to enter said data into said at least one register cache according to said potential significance.

10. The apparatus of claim 9, wherein at least one register cache, wherein said reference count circuit is further to enter said data of said one or more physical registers into said at least one register cache according to said potential significance.

11. The apparatus of claim 9, wherein said reference count circuit is to enter said data when said potential significance is high.

12. The apparatus of claim 9, wherein said reference count circuit is to insert said data when said potential significance is low.

13. The apparatus of claim 9, wherein said reference count circuit is to insert said data into an empty slot in said at least one register cache.

14. The apparatus of claim 9, wherein said reference count circuit is to select and evict previous data from a slot in said at least one register cache according to a potential significance of said previous data prior to inserting said data.

15. The apparatus of claim 9, said counter look-up table further comprising:
at least one physical register identifier; and
at least one counter associated with said physical register identifier, wherein said at least one counter is to indicate the number of references to said physical register in the instructions of the instruction window.

16. The apparatus of claim 15, wherein said reference count circuit is further to increment the counter for each of said references.

17. A system, comprising:
a processor including an instruction window to hold a plurality of instructions, the plurality to include at least one future instruction, one or more physical registers to store data associated with said at least one future instruction, a counter look-up table to track one or more physical register references in the instruction window to said one or more physical registers, a reference count circuit to determine a potential significance for data of said one or more physical registers based on said physical register references, and at least one register cache, wherein said reference count circuit is to enter said data into said at least one register cache according to said potential significance;
an interface to couple said processor to input-output devices; and
a data storage coupled to said interface to receive code from said processor.

18. The system of claim 17, wherein said reference count circuit is to enter said data of said one or more physical registers into said at least one register cache according to said potential significance to the plurality of instructions in the instruction window, including to said future instruction.

19. The system of claim 17, wherein said reference count circuit is to enter said data responsive to said potential significance being high.

20. The system of claim 17, wherein said reference count circuit is to enter said data responsive to said potential significance being low.

21. The system of claim 17, wherein said reference count circuit is further to enter said data into an empty slot in said at least one register cache.

22. The system of claim 17, wherein said reference count circuit is further to select and evict previous data from a slot in said at least one register cache according to a potential significance of said previous data prior to inserting said data.

23. The system of claim 17, further comprising:
one or more additional physical registers to store data associated with the plurality of instructions;
wherein said counter look-up table is further to track one or more physical register references in the instruction window to said additional physical registers.

24. The system of claim 17, wherein said reference count circuit is further to increment said counter for each of said at least one physical register references.

* * * * *